(12) United States Patent
Juan Lien Chang

(10) Patent No.: US 9,777,786 B2
(45) Date of Patent: Oct. 3, 2017

(54) CLUTCH DISC WITH FASTENERS ARRANGED AT OFFSET PITCH CIRCLES

(71) Applicant: Schaeffler Technologies AG & Co. KG, Herzogenaurach (DE)

(72) Inventor: Raymundo Juan Lien Chang, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 170 days.

(21) Appl. No.: 14/740,903

(22) Filed: Jun. 16, 2015

(65) Prior Publication Data

US 2016/0369850 A1     Dec. 22, 2016

(51) Int. Cl.
*F16D 69/04* (2006.01)
*F16D 13/64* (2006.01)

(52) U.S. Cl.
CPC .......... *F16D 69/0408* (2013.01); *F16D 13/64* (2013.01); *F16D 2069/0433* (2013.01)

(58) Field of Classification Search
CPC ...................................................... F16D 13/68
See application file for complete search history.

(56) References Cited

U.S. PATENT DOCUMENTS

| | | | | |
|---|---|---|---|---|
| 1,855,533 A | * | 4/1932 | Tower | F16D 13/68 192/107 R |
| 2,100,362 A | * | 11/1937 | Stahle | F16D 13/68 192/207 |
| 2,296,957 A | * | 9/1942 | Spase | F16D 13/68 192/30 V |
| 4,260,048 A | * | 4/1981 | Beccaris | F16D 13/64 192/107 C |
| 4,529,078 A | * | 7/1985 | Keck | F16D 13/64 192/103 A |
| 4,941,558 A | * | 7/1990 | Schraut | F16D 13/64 192/107 C |

* cited by examiner

*Primary Examiner* — Jacob S Scott
(74) *Attorney, Agent, or Firm* — Simpson & Simpson, PLLC

(57) ABSTRACT

A clutch disc including a drive plate concentrically arranged about an axis of rotation, the drive plate having: a first side facing a first axial direction; a second side facing a second axial direction, opposite the first axial direction. The drive plate includes a first plurality of through-bores at a first radial distance from the axis of rotation and a second plurality of through-bores at a second radial distance from the axis of rotation, where the second radial distance is different from the first radial distance. The first and second pluralities of through-bores are arranged such that an arc passes through the first and second pluralities of through-bores.

20 Claims, 13 Drawing Sheets

CLUTCH DISC WITH FASTENERS ARRANGED AT OFFSET PITCH CIRCLES

TECHNICAL FIELD

The present disclosure relates generally to a clutch disc, and, more particularly, to a clutch plate, for a clutch disc, having a first side suitable for a first friction lining and a second side suitable for a second friction lining arranged such that an improper assembly of the friction linings on their respective sides is prevented.

BACKGROUND

FIG. 12 is an enlarged view of a portion of a prior art clutch disc with fasteners arranged at two different radial distances. The clutch disc is a critical component in a clutch that provides smooth engagement and dampens engine vibrations. Typically, the clutch disc is mounted to the input shaft between the flywheel and the clutch. Vehicles with high engine-performance-demand require clutch discs that have a friction material facing the transmission and a friction material facing the engine. Some clutch discs have the same friction material on both sides. Other clutch discs have different materials, for example, an organic friction material on the transmission side and a cerametallic friction material on the engine side. Organic material wears quicker than cerametallic material but reduces clutch chatter. Cerametallic material is more robust than organic material but results in more clutch chatter. Traditionally, the friction material is secured to the clutch disc using rivets placed circumferentially along at least one pitch circle. FIG. 12 shows typical clutch disc 80 including damper 81 and friction lining 82. Friction lining 82 is secured to clutch disc 80 with fasteners 83 and 84. Fasteners 83 are arranged along pitch circle 85 and fasteners 84 are arranged along pitch circle 86. In circumferential direction CD, fasteners 83 are not aligned with plurality of fasteners 84.

In order to facilitate assembly, the fasteners used to secure the friction materials are applied symmetrically. Unfortunately, due to the symmetrical nature of the holes in the clutch disc for receiving fasteners 83 and 84, the friction materials can be inadvertently placed on the wrong side of the clutch disc. That is, for clutch discs with a different type of friction lining on each side, the holes will accommodate either friction lining on either of the sides of the clutch disc. In that case, the clutch disc is vulnerable to excessive wear and sub-optimal performance during operation of the vehicle.

SUMMARY

According to aspects illustrated herein, there is provided a clutch disc including a drive plate concentrically arranged about an axis of rotation, the drive plate having: a first side facing a first axial direction and a second side facing a second axial direction, opposite the first axial direction. The drive plate includes a first plurality of through-bores at a first radial distance from the axis of rotation and a second plurality of through-bores at a second radial distance from the axis of rotation, where the second radial distance is different from the first radial distance. The first and second pluralities of through-bores are arranged such that an arc passes through the first and second pluralities of through-bores.

According to aspects illustrated herein, there is provided a clutch disc including a drive plate concentrically arranged about an axis of rotation, the drive plate having: a first side facing a first axial direction and a second side facing a second axial direction, opposite the first axial direction. The drive plate includes a first plurality of through-bores at a first radial distance from the axis of rotation, a second plurality of through-bores at a second radial distance from the axis of rotation, where the second radial distance is different from the first radial distance, and a third plurality of through-bores at a third radial distance from the axis of rotation, different from the first and second radial distances. The first and second pluralities of through-bores are arranged such that an arc passes through the first and second pluralities of through-bores.

According to aspects illustrated herein, there is provided a drive plate concentrically arranged about an axis of rotation, the drive plate having: a first side facing a first axial direction and a second side facing a second axial direction, opposite the first axial direction. The drive plate includes a first plurality of through-bores at a first radial distance from the axis of rotation, the first plurality including a first through-bore, and a second plurality of through-bores at a second radial distance from the axis of rotation, where the second radial distance is different from the first radial distance, the second plurality including circumferentially adjacent respective second and third through-bores. The first through-bore is circumferentially disposed between the respective circumferentially adjacent second and third through-bores, the circumferentially adjacent respective second through-bore is at a first distance, in the first circumferential direction, from the first through-bore, the circumferentially adjacent respective third through-bore is at a second distance, different from the first distance, in a second circumferential direction, opposite the first circumferential direction, from the first through-bore and the first and second pluralities of through-bores are arranged such that an arc passes through the first and second pluralities of through-bores.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
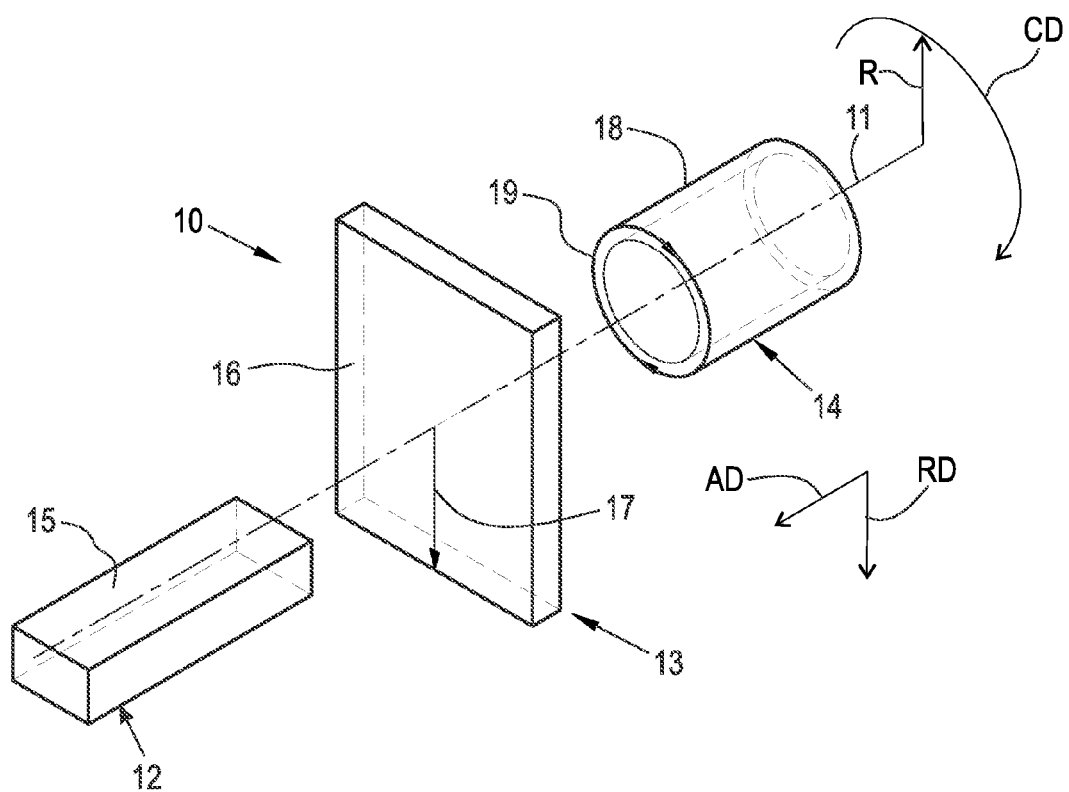
FIG. 1 is a perspective view of a cylindrical coordinate system demonstrating spatial terminology used herein.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
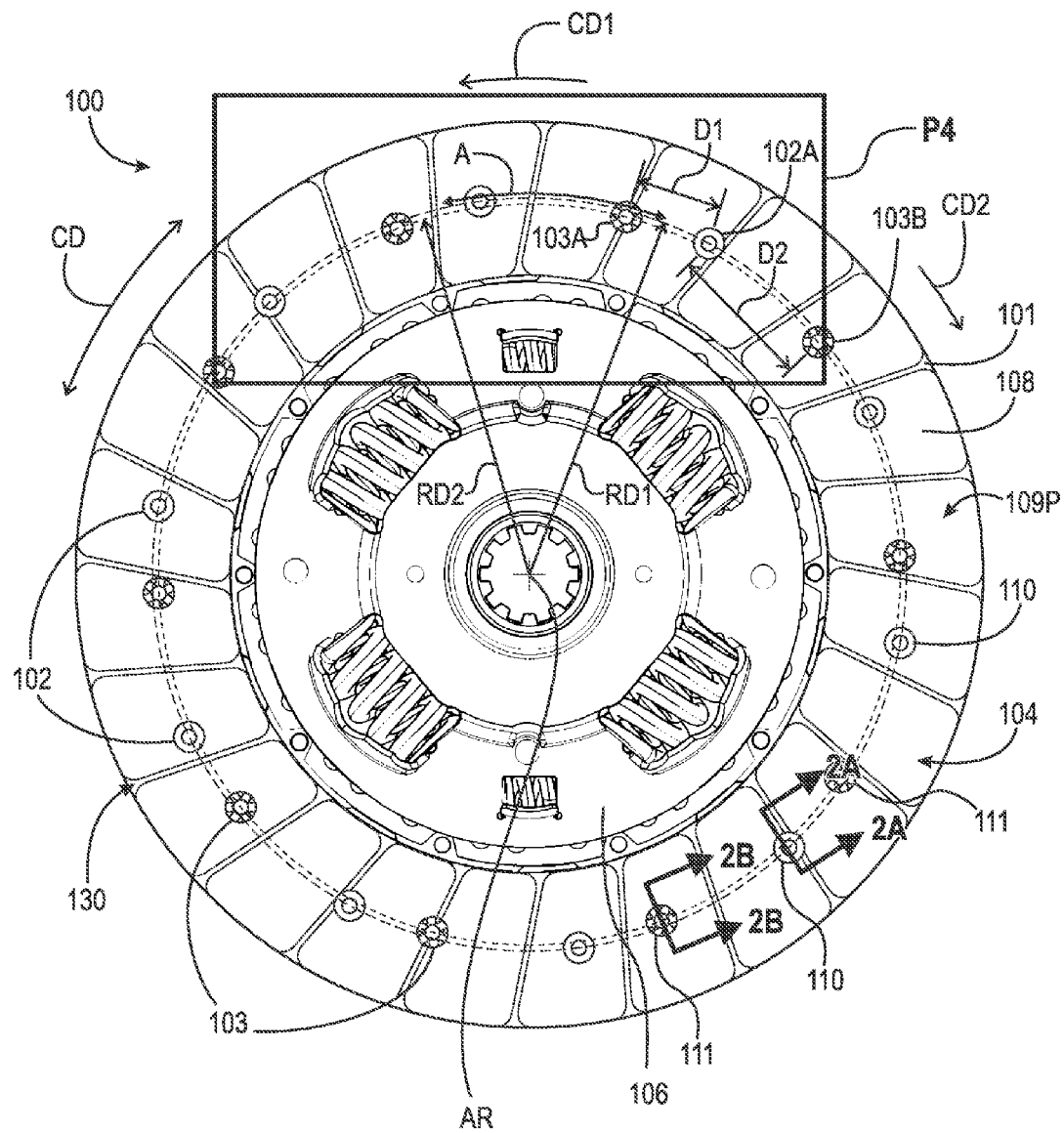
FIG. 2 is a front view of a clutch disc with fasteners arranged at two different radial distances.

FIG. 2 is a front view of clutch disc 100 with fasteners arranged at two radial distances RD1 and RD2.

Figure 2A:
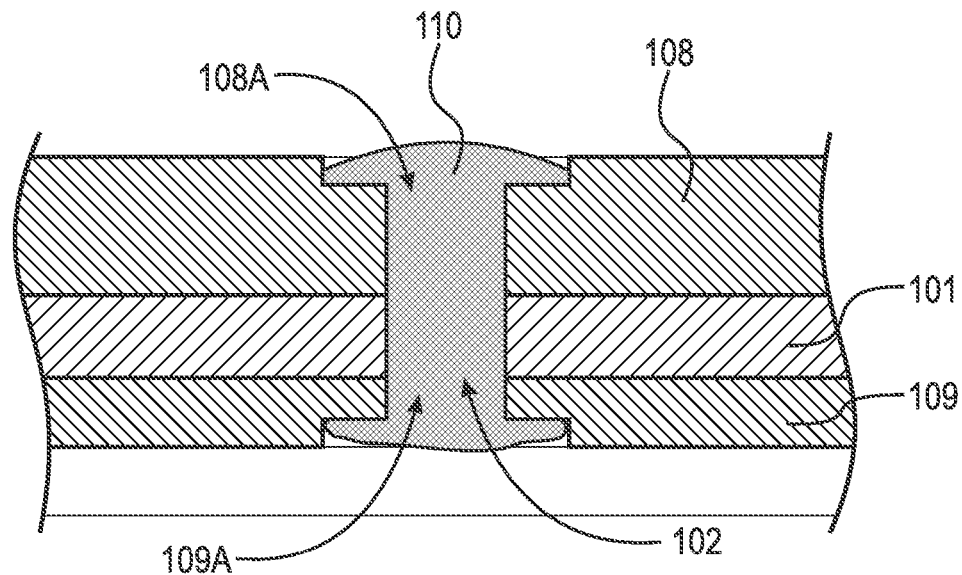
FIG. 2A is a cross-sectional view taken generally along line 2A-2A in FIG. 2.

FIG. 2A is a cross-sectional view taken generally along line 2A-2A in FIG. 2.

Figure 2B:
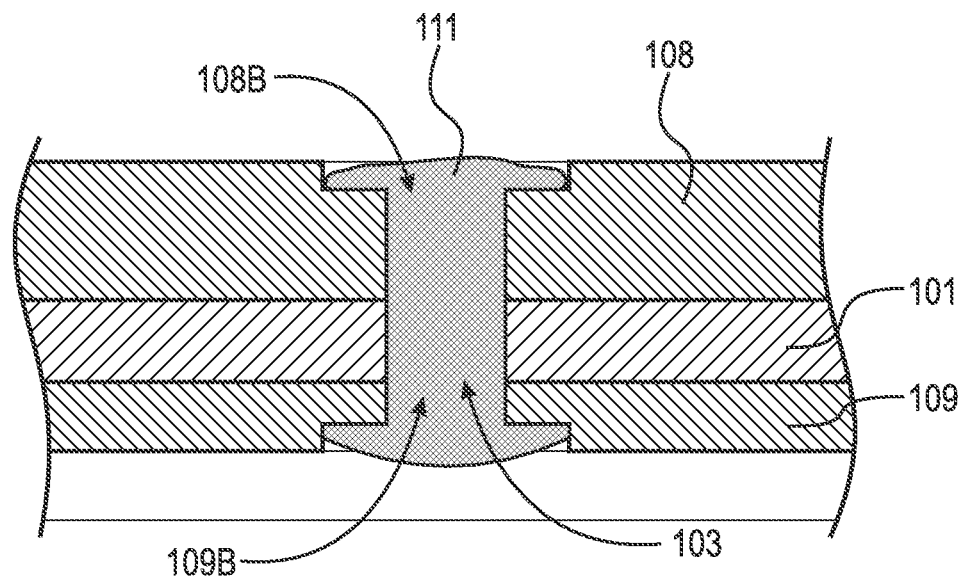
FIG. 2B is a cross-sectional view taken generally along line 2B-2B in FIG. 2.

FIG. 2B is a cross-sectional view taken generally along line 2B-2B in FIG. 2.

Figure 3:
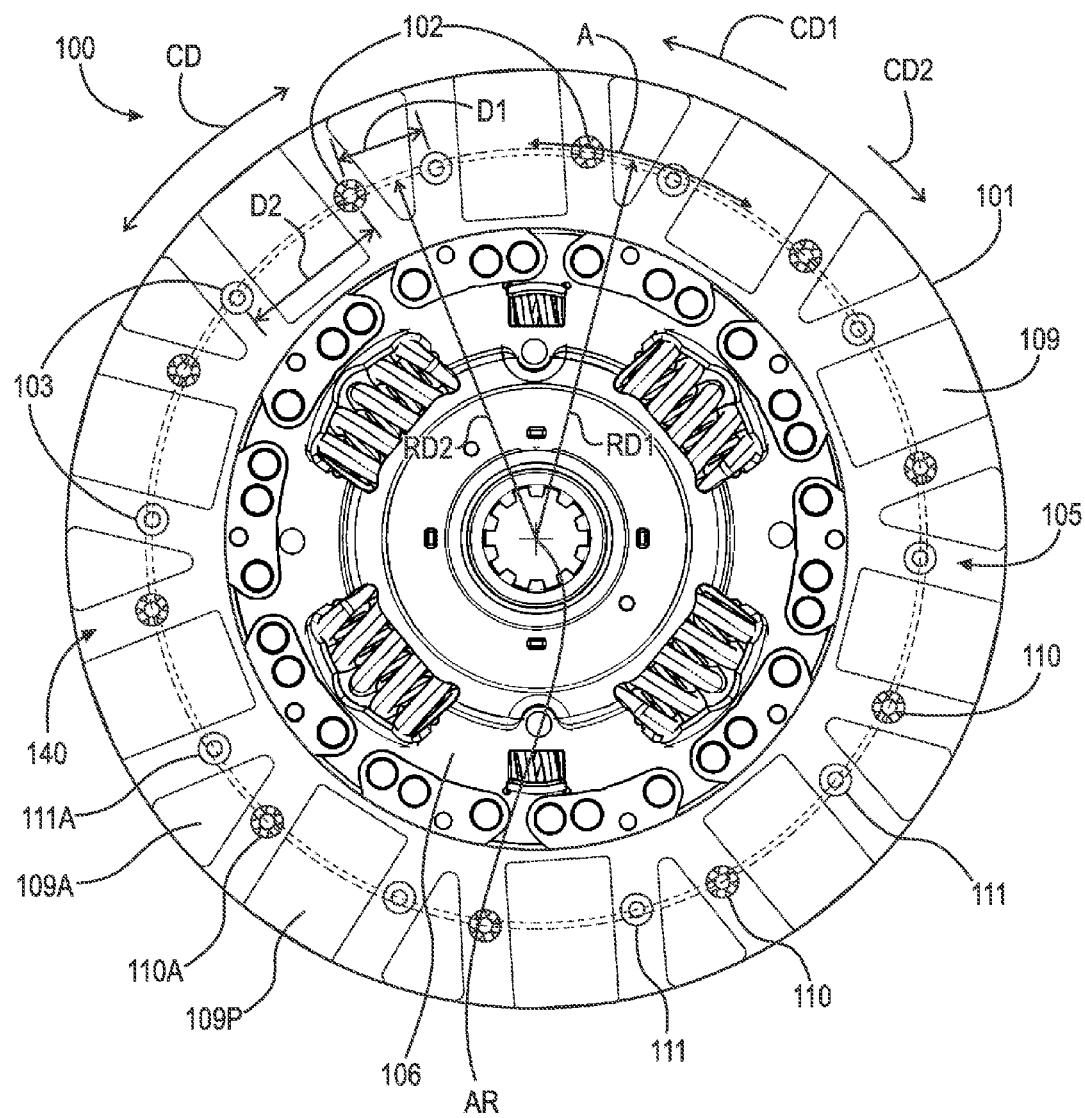
FIG. 3 is a rear view of the clutch disc in FIG. 2.

FIG. 3 is a rear view of clutch disc 100 in FIG. 2.

Figure 4:
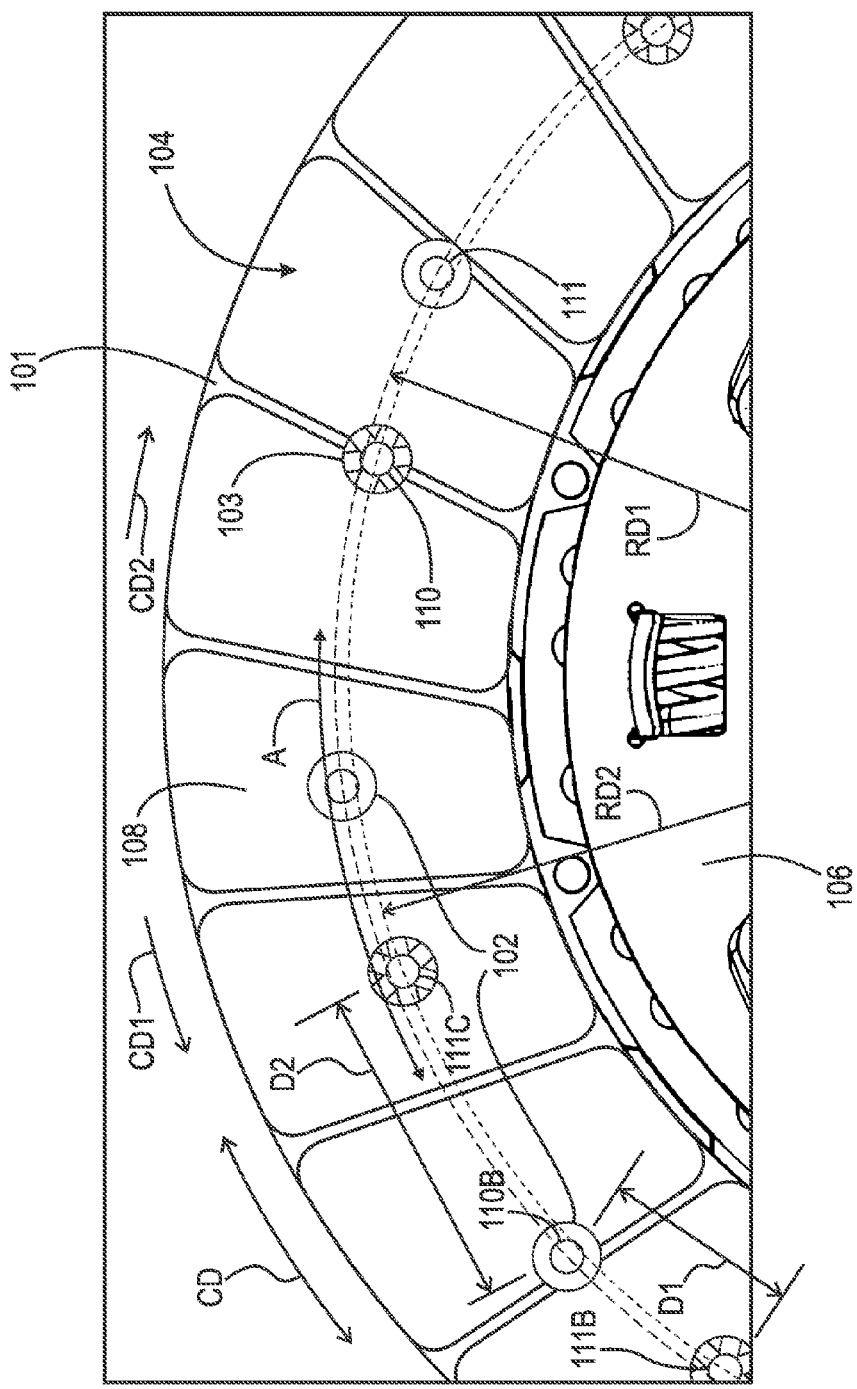
FIG. 4 is an enlarged view of portion P4 of the clutch disc in FIG. 2.

FIG. 4 is an enlarged view of portion P4 of clutch disc 100 in FIG. 2. The following should be viewed in light of FIGS. 2 through 4. Clutch disc 100 includes drive plate 101 concentrically arranged about axis of rotation AR and drive plate 101 includes side 104 facing axial direction AD1 and side 105 facing axial direction AD2, opposite axial direction AD1. Drive plate 101 includes through-bores 102 arranged at radial distance RD1 from axis of rotation AR and through-bores 103 arranged at radial distance RD2 from axis of rotation AR where radial distance RD1 is different from radial distance RD2. Arc A passes through through-bores 102 and 103 in circumferential direction CD. In other words, through-bores 102 and 103 are arranged such that arc A passes through through-bores 102 and 103. It should be understood that clutch disc 100 is not limited to a particular ratio of RD1 to RD2. In an example embodiment, arc A passes in circumferential direction CD.

In an example embodiment, clutch disc 100 includes damper 106 arranged radially inward of drive plate 101. When the through-bores are described as being arranged at radial distances, it is meant that the through-bores are arranged along pitch circles. The phrases "arranged at radial distances" and "arranged along pitch circles" are used interchangeably.

In an example embodiment, friction lining 108 (shown in FIG. 2) is secured to side 104 of drive plate 101 via fasteners 111 via through-bores 103. That is, fasteners 111 are disposed in through-bores 103. In other words, clutch disc 100 can include friction lining 108 secured to side 104 of drive plate 101 with fasteners 111 disposed in through-bores 103. In an example embodiment, friction lining 109 (shown in FIG. 3) is secured to side 105 of drive plate 101 via fasteners 110 via through-bores 102. That is, fasteners 110 are disposed in through-bores 102. In other words, clutch disc 100 can include friction lining 109 secured to side 105 of drive plate 101 with fasteners 110 disposed in through-bores 102. In an example embodiment, clutch disc 100 includes both friction linings 108 and 109 secured on opposing axial faces 104 and 105, respectively. It should be understood that clutch disc 100 is not limited to the particular fasteners used to secure friction linings 108 and 109 shown. For example, friction lining 108 can be secured to side 104 with any combination of fasteners 110 and 111 and friction lining 109 can be secured to side 105 with any combination of fasteners 110 and/or 111.

Referring to FIG. 2, each through-bore 102A of through-bores 102 is circumferentially disposed between pairs of through-bores 103, for example, circumferentially adjacent pairs of through-bores 103A and 103B. Through-bore 103A is arranged distance D1, in circumferential direction CD1, from through-bore 102A. Through-bore 103B is arranged distance D2, in circumferential direction CD2, from through-bore 102A. Distance D1 is smaller than distance D2; thus, through-bore 102A is asymmetrically disposed between through-bores 103A and 103B, respectively. Although through-bores 102 and 103 are shown alternating in direction CD1, it should be understood that other sequences of through-bores 102 and 103 are possible. For example, a respective through-bore 102 may not be located between each pair of circumferentially adjacent bores 103.

Since through-bores 102 are arranged radially offset from and asymmetrically between circumferentially disposed through-bores 103, friction lining 108 can be secured to side 104 only and not to side 105 by fasteners 111 and friction lining 109 can be secured to side 105 only and not to side 104 by fasteners 110. It should be understood that distances D1 and D2 can be reversed. Disc 100 is not limited to a particular ratio of distance D1 to distance D2.

In an example embodiment, friction lining 108 is a full ring of friction material, for example, organic material, secured to drive plate 101. In an example embodiment, friction lining 108 is a full ring of an organic material with grooves that is fixed to individual segments via rivets and those segments are, in turn, fixed within clutch disc 100. In an example embodiment, friction lining 109 includes portions 109P disposed circumferentially about drive plate 101. More specifically, friction lining 109, in an example embodiment, includes individual cerametallic friction pads bonded to a plate and rivets fix the plate within clutch disc 100. In the example embodiment shown in FIG. 3, friction lining 109 is circumferentially segmented and portion 109A is a segment of circumferentially segmented friction lining 109 and circumferentially disposed between one fastener 110A of fasteners 110 and one fastener 111A of fasteners 111. Fasteners 110 are arranged along a first pitch circle and fasteners 111 are arranged along a second pitch circle radially offset from the first pitch circle.

Referring to FIG. 2A, friction linings 108 and 109 are fabricated with through-bores 108A and 109A, respectively, arranged to be aligned with through-bores 102 to accommodate fasteners 110. Friction linings 108 and 109 are applied to opposing axial faces 104 and 105, respectively, and thus, are mirror images when assembled with clutch disc 100. As mirror images, so long as friction lining 108 is applied to axial face 104 and friction lining 109 is applied to axial face 105, through-bores 102 of drive plate 101 and through-bores 108A and 109A of friction linings 108 and 109, respectively, are aligned to accommodate fasteners 110. Similarly, referring to FIG. 2B, friction linings 108 and 109 are fabricated with through-bores 108B and 109B, respectively, arranged to be aligned with through-bores 103 to accommodate fasteners 111. In other words, fasteners 110 are disposed in through-bores 108A, 102 and 109A and fasteners 111 are disposed in through-bores 108B, 103 and 109B.

Referring to FIG. 4, Fastener 110B of fasteners 110 is circumferentially disposed between fasteners 111B and 111C, respectively, of fasteners 111. Fastener 111B is arranged distance D1, in circumferential direction CD1, from fastener 110B and fastener 111C is arranged distance D2, different from distance D1, in circumferential direction CD2, opposite circumferential direction CD1, from fastener 110B. When assembled, each fastener 110 is circumferentially disposed between pairs of fasteners 111, for example, circumferentially adjacent fasteners 111. In an example embodiment, similarly, each through-bore 102 is circumferentially disposed between pairs of through-bores 103, for example, circumferentially adjacent through-bores 103.

Due to fasteners 110 and 111 being arranged asymmetrically and at different radial distances RD1 and RD2, respectively, (or along offset pitch circles), if friction lining 108 is applied to axial face 105 and/or friction lining 109 is applied to axial face 104, through-bores 102 of drive plate 101 and through-bores 108A and 109A of friction linings 108 and 109, respectively, are not aligned to accommodate fasteners 110. Similarly, through-bores 103 of drive plate 101 and through-bores 108B and 109B of friction linings 108 and 109, respectively, are not aligned to accommodate fasteners 111. This arrangement prevents the improper assembly of clutch disc 100 with friction linings 108 and 109 on faces 105 and 104, respectively.

In an example embodiment, fasteners 110 and 111 are rivets used to bond friction linings 108 and 109 to sides 104 and 105, respectively.

Referring to FIG. 2, in an example embodiment, friction lining 108 is made of an organic material. In an example embodiment, friction lining 108 is made of yarn (roving, aramid, copper wire, and acrylic yarn) which is coated with a friction cement (rubber, resins, sulpher, glass fiber). Referring to FIG. 3, in an example embodiment, friction lining 109 is made of a cerametallic material. Cerametallic materials are more aggressive and have a higher coefficient of friction than organic materials. The combination of the organic and cerametallic materials of friction linings 108 and 109 provides increased power levels without slippage.

In an example embodiment, grooves 130 and 140 are cut into friction linings 108 and 109, respectively, to aid cooling and release of the clutch disc.

Figure 5:
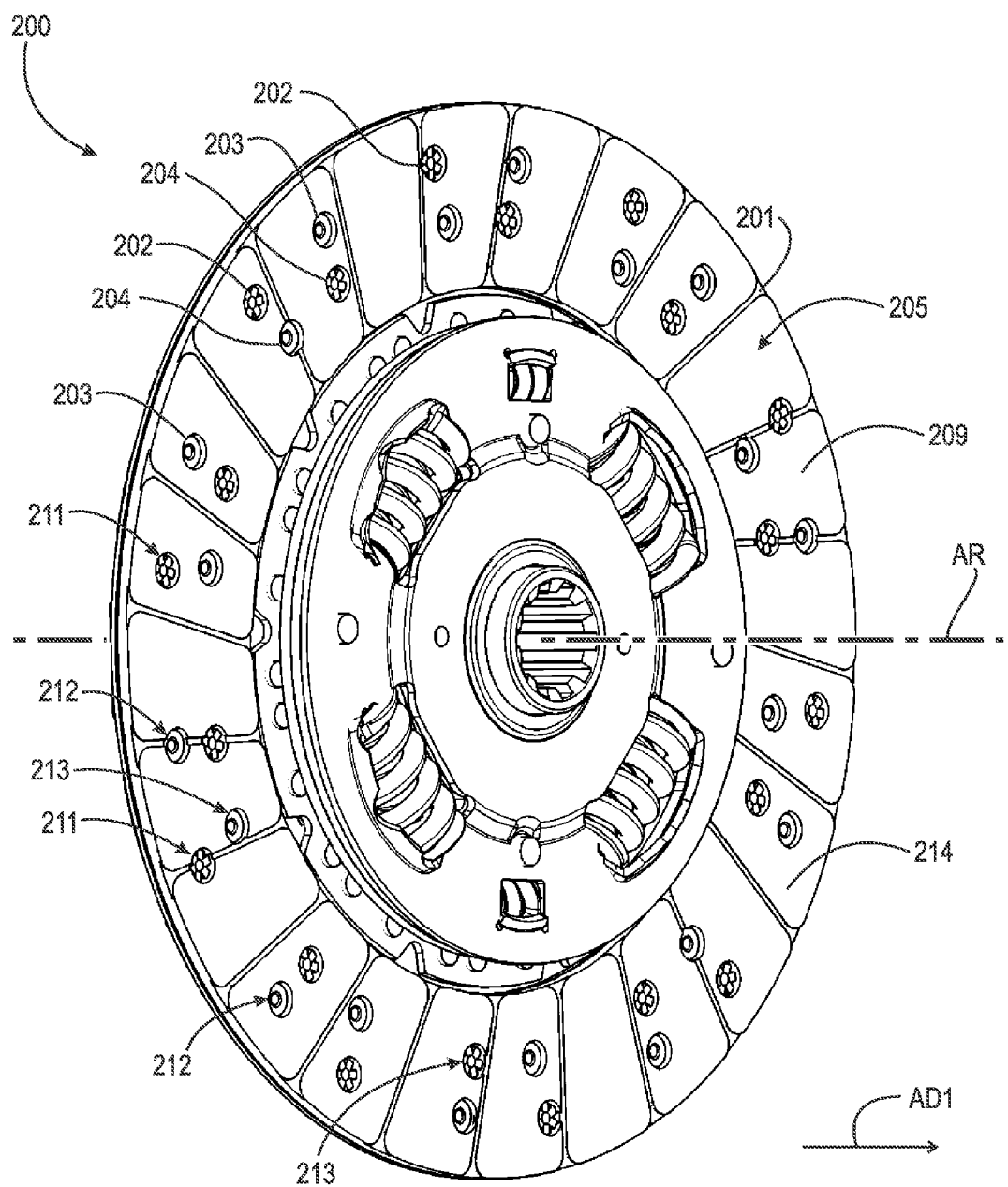
FIG. 5 is a front perspective view of a clutch disc with fasteners arranged at three different radial distances.

FIG. 5 is a front perspective view of clutch disc 200 with fasteners arranged at three different radial distances.

Figure 6:
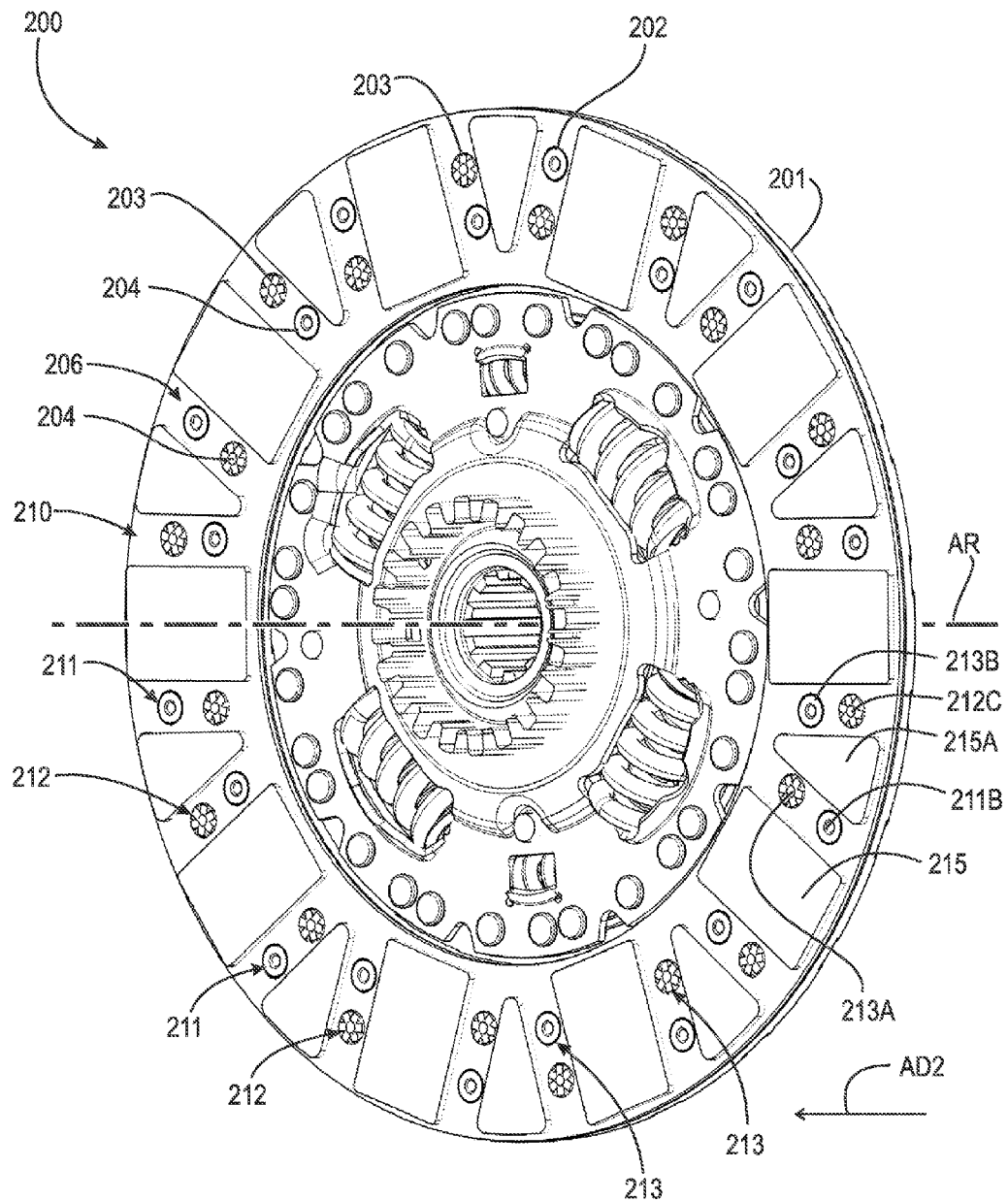
FIG. 6 is a rear perspective view of a clutch disc with fasteners arranged at three different radial distances.

FIG. 6 is a rear perspective view of clutch disc 200 in FIG. 5.

Figure 7:
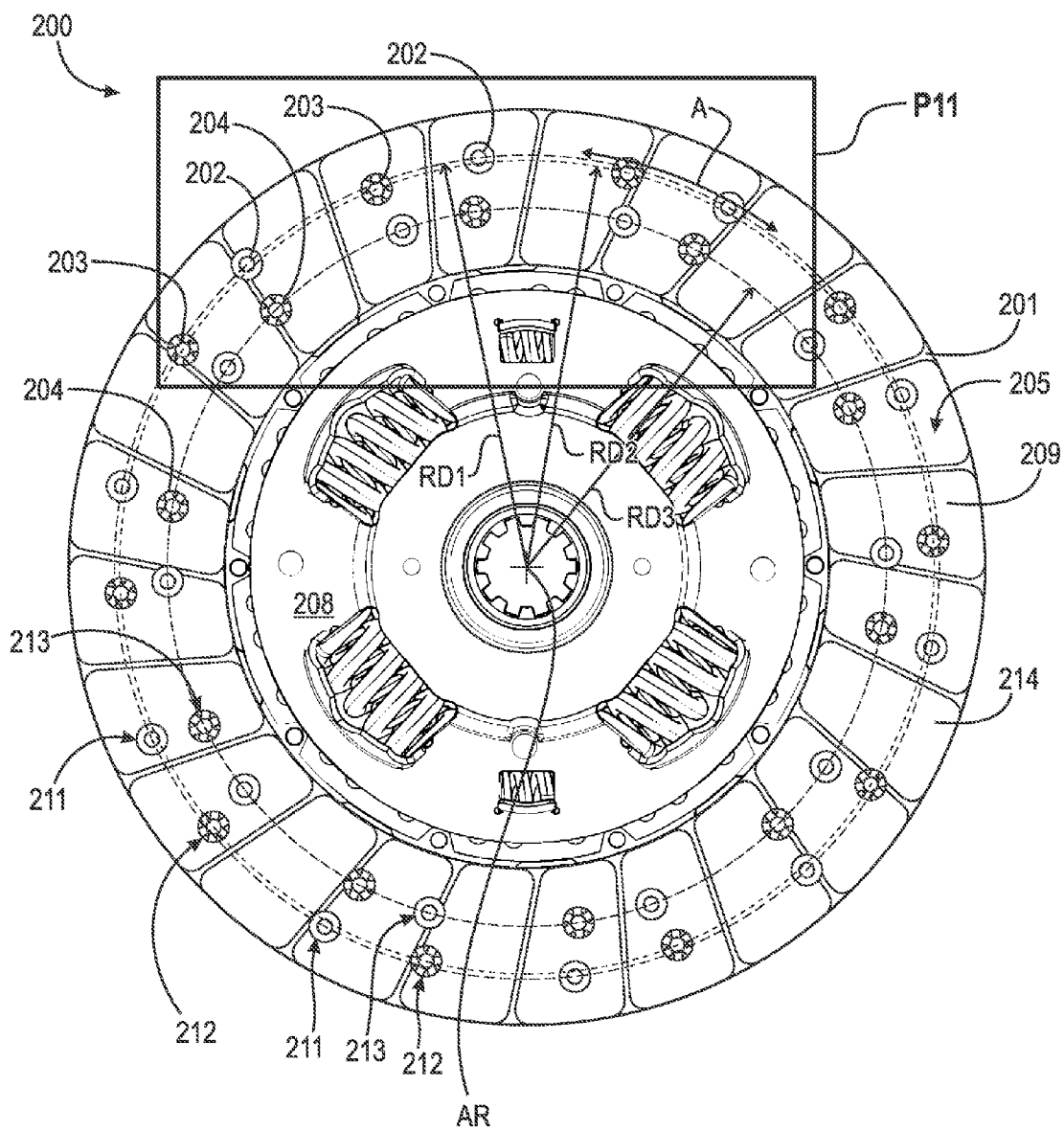
FIG. 7 is a front view of the clutch disc in FIG. 5.

FIG. 7 is a front view of clutch disc 200 in FIG. 5.

Figure 8:
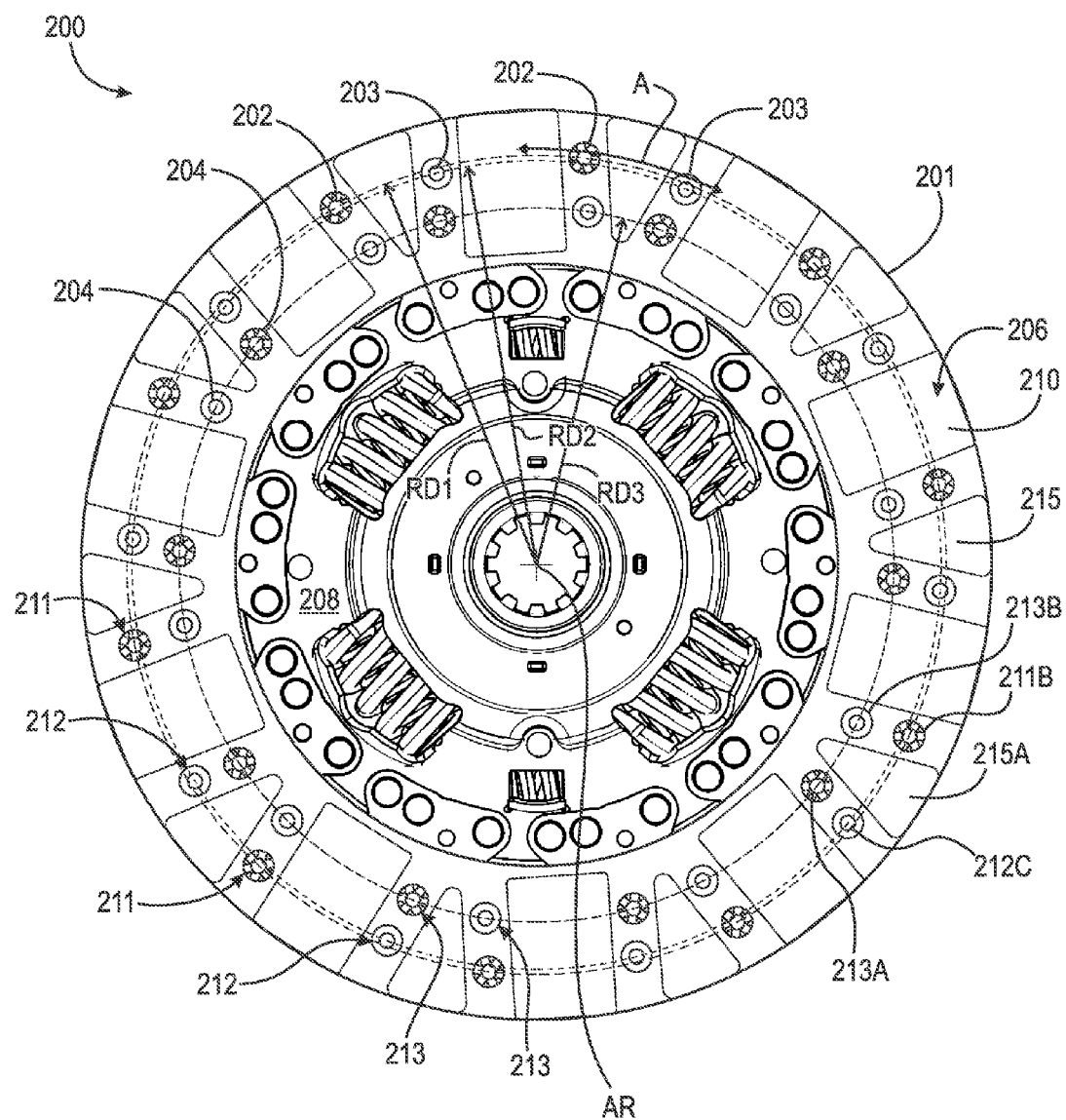
FIG. 8 is a rear view of the clutch disc in FIG. 5.

FIG. 8 is a rear view of clutch disc 200 in FIG. 5.

Figure 9:
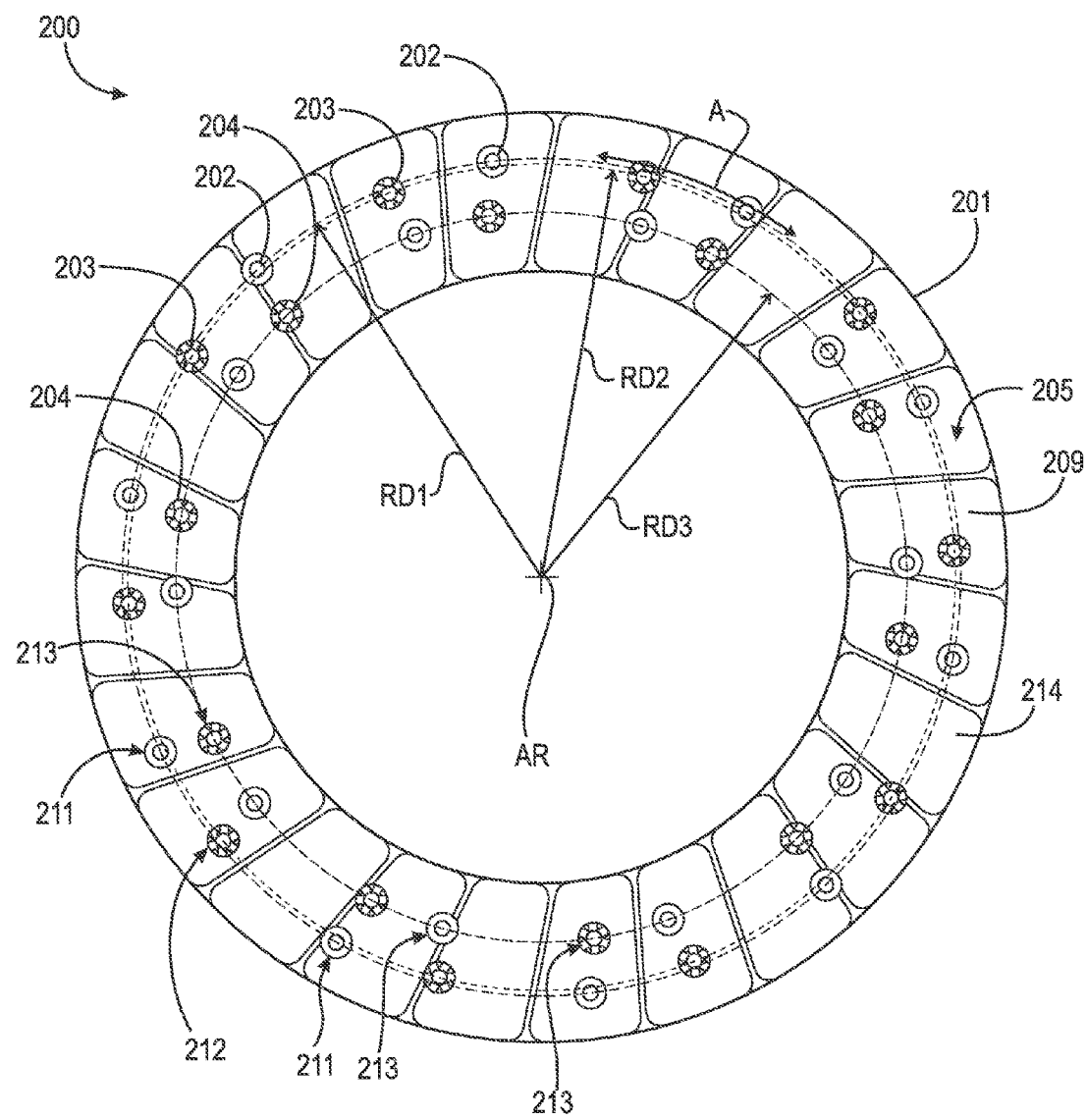
FIG. 9 is a front view of the clutch disc in FIG. 5 with the damper removed.

FIG. 9 is a front view of clutch disc 200 in FIG. 5 with the damper removed.

Figure 10:
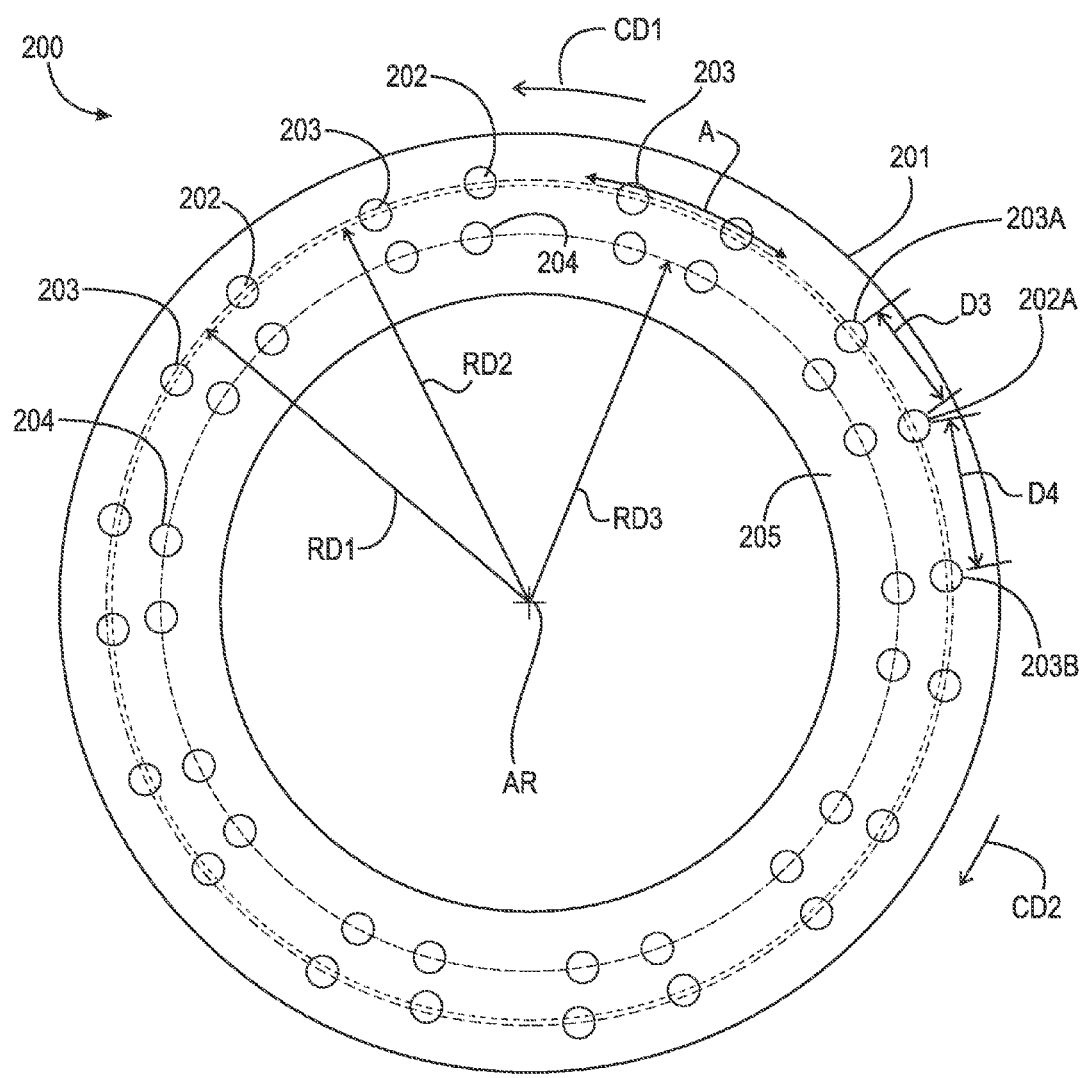
FIG. 10 is a front view of the clutch disc in FIG. 5 with the damper and friction lining removed.

FIG. 10 is a front view of clutch disc 200 in FIG. 5 with the damper and friction lining removed.

Figure 11:
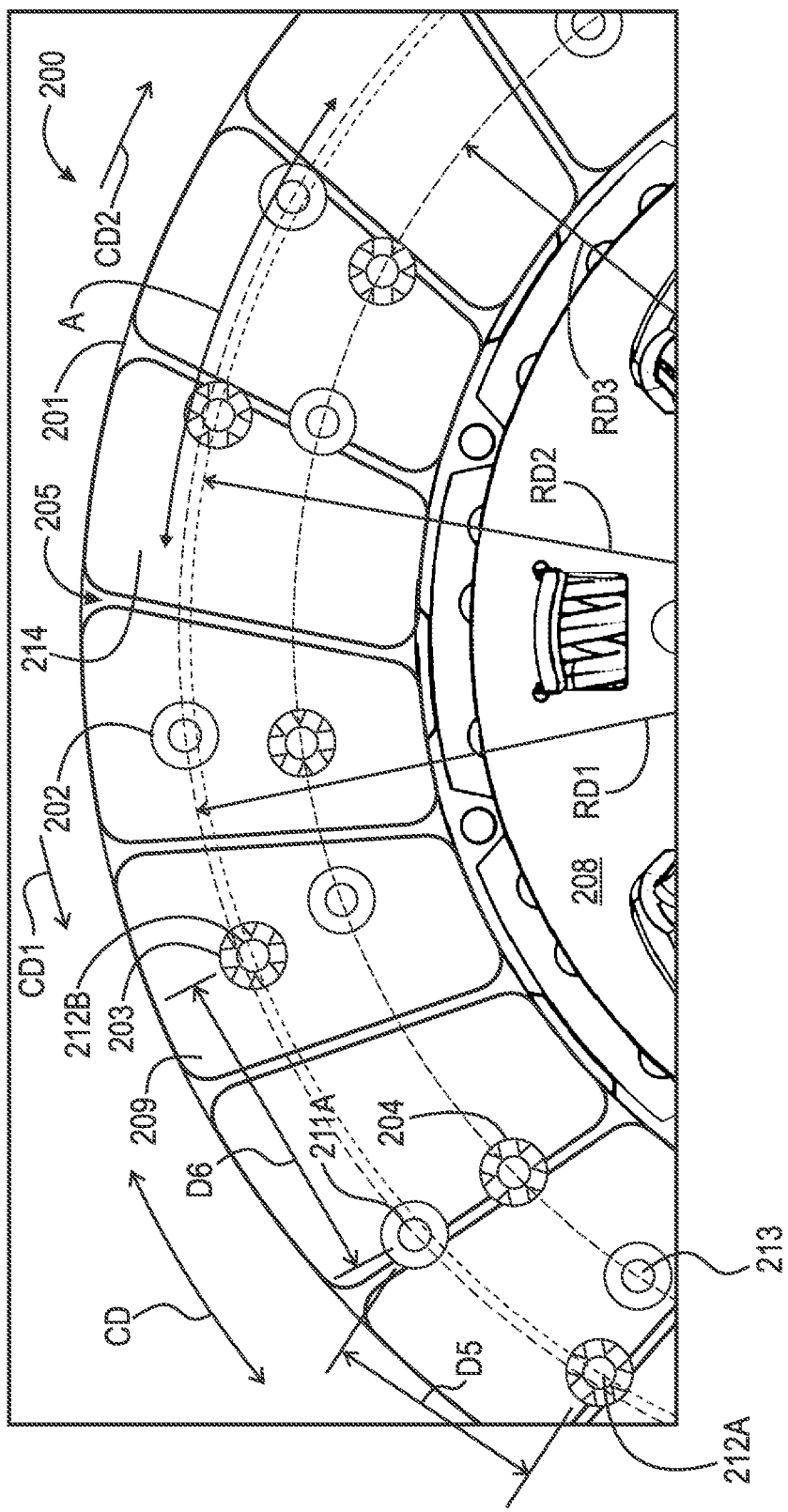
FIG. 11 is an enlarged view of portion P11 of the clutch disc in FIG. 7.
Figure 12:
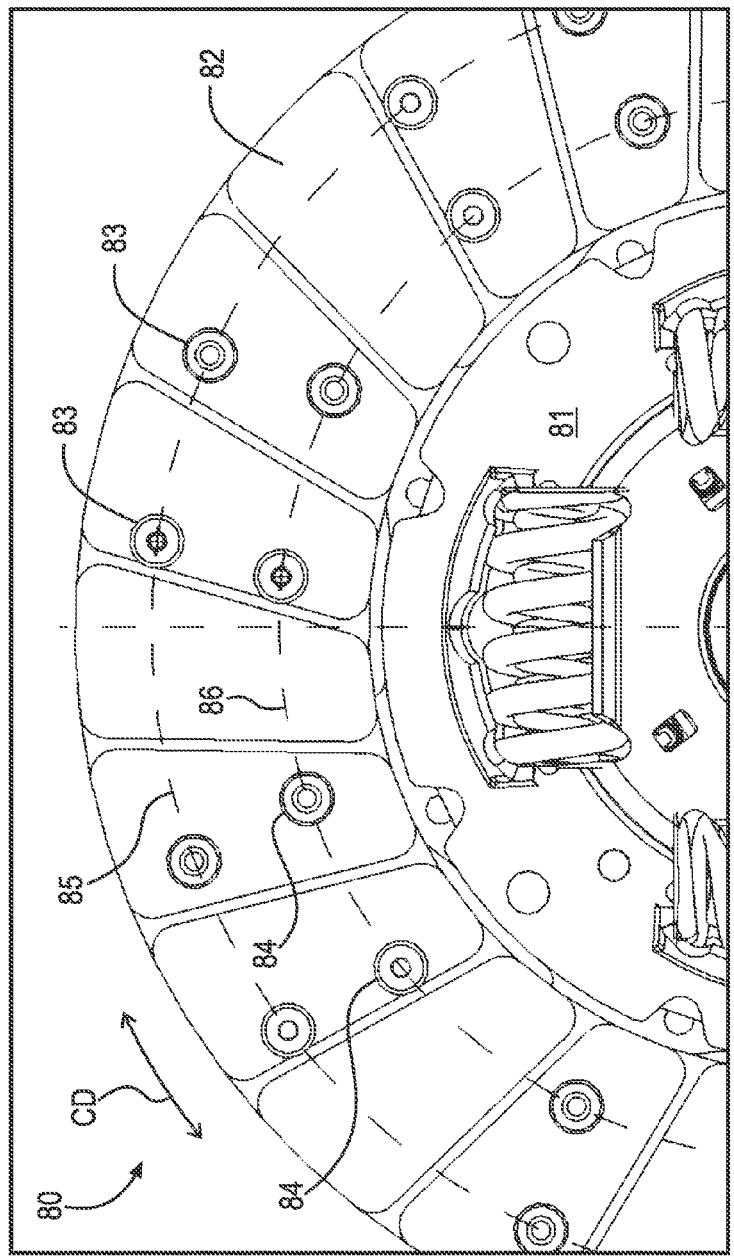
FIG. 12 is an enlarged view of a portion of a prior art clutch disc with fasteners arranged at two different radial distances.

FIG. 11 is an enlarged view of portion P11 of clutch disc 200 in FIG. 7. The following should be viewed in light of FIGS. 5 through 11. The previous discussion regarding the alignment of through-bores 102 and 103 with through-bores 108A, 109A, 108B and 109B of friction linings 108 and 109 to accommodate fasteners 110 and 111 is applicable to through-bores 202, 203 and 204 and the through-bores of friction linings 209 and 210 as they accommodate fasteners 211, 212 and 213. In other words, the through-bores of friction linings 209 and 210 are arranged like through-bores 108A, 109A, 108B and 109B and aligned with through-bores 202, 203 and 204 to accommodate fasteners 211, 212 and 213. Clutch disc 200 includes drive plate 201 concentrically arranged about axis of rotation AR and drive plate 201 includes side 205 facing axial direction AD1 and side 206 facing axial direction AD2, opposite axial direction AD1. Drive plate 201 includes through-bores 202 arranged at radial distance RD1 from axis of rotation AR, through-bores 203 arranged at radial distance RD2 from axis of rotation AR, and through-bores 204 arranged at radial distance RD3 from axis of rotation AR. Radial distances RD1, RD2 and RD3 are different. Arc A passes through through-bores 202 and 203. In an example embodiment, arc A passes through through-bores 202 and 203 in circumferential direction CD. In other words, through-bores 202 and 203 are arranged such that arc A passes through through-bores 202 and 203. It should be understood that clutch disc 200 is not limited to particular ratios between RD1, RD2 and RD3. In an example embodiment, arc A passes in circumferential direction CD.

In an example embodiment, clutch disc 200 includes damper 208 arranged radially inward of drive plate 201.

In an example embodiment, through-bores 202 are radially outward of through-bores 203 and 204, respectively. In an example embodiment, through-bores 202 are radially inward of through-bores 203 and radially outward of through-bores 204. In other words, through-bores 202 and 203 can be reversed.

In an example embodiment, friction lining 209 (shown in FIGS. 5, 7, 9 and 11) is secured to side 205 of drive plate 201 via fasteners 211 and 213, respectively, via through-bores 202 and 204, respectively. That is, fasteners 211 and 213 are disposed in through-bores 202 and 204, respectively. In an example embodiment, friction lining 210 (shown in FIGS. 6 and 8) is secured to side 206 of drive plate 201 via fasteners 212 and 213, respectively, via through-bores 203, and 204, respectively. That is, fasteners 212 and 213 are disposed in through-bores 203, and 204, respectively. It should be understood that fasteners 213 secure both friction linings 209 and 210.

In an example embodiment, clutch disc 200 includes both friction linings 209 and 210 on opposing axial faces 205 and 206, respectively. Referring to FIG. 5, in an example embodiment, each fastener 211 is arranged a distance in circumferential direction CD2 from a circumferentially adjacent fastener 212. Adjacent fasteners 211 and 212 in circumferential direction CD2 together with two fasteners 213 form a quadrilateral. In an example embodiment, the two radially inward fasteners 213 in the quadrilateral arrangement are arranged circumferentially between fastener 211 and circumferentially adjacent fastener 212 in circumferential direction CD2 of the quadrilateral arrangement. In an example embodiment, the quadrilateral is a trapezoid, or trapezoidal. Furthermore, it should be understood that through-bores 202, 203 and 204 form a similar quadrilateral arrangement. For example, each through-bore 202 is arranged a distance in circumferential direction CD2 from a circumferentially adjacent through-bore 203 and the circumferentially adjacent through-bores 202 and 203 together with two radially inward through-bores 204 form a quadrilateral. In an example embodiment, the two radially inward through-bores 204 are arranged circumferentially between through-bore 202 and the circumferentially adjacent through-bore 203. In FIG. 5, starting at 12 o'clock there are ten such quadrilateral arrangements shown. It should be understood that drive plate 201 could have additional or fewer quadrilateral arrangements. It should be understood that this quadrilateral arrangement prevents misassembly of friction linings 209 and 210 on drive plate 201.

Referring to FIG. 10, each through-bore 202A of through-bores 202 is circumferentially disposed between pairs of through-bores 203, for example, circumferentially adjacent pairs of through-bores 203A and 203B. Through-bore 203A is arranged distance D3, in circumferential direction CD1, from through-bore 202A. Through-bore 203B is arranged distance D4, in circumferential direction CD2, opposite circumferential direction CD1, from through-bore 202A. Distance D3 is smaller than distance D4; thus, through-bore 202A is asymmetrically disposed between through-bores 203A and 203B. It should be understood that distances D3 and D4 can be reversed. Clutch disc 200 is not limited to a particular ratio of distance D3 to distance D4. In an example embodiment, clutch disc 200 includes axis of rotation AR, drive plate 201 concentrically arranged about axis of rotation AR, drive plate 201 having: side 205 facing axial direction AD1 and side 206 facing axial direction AD2, opposite axial direction AD1, through-bores 202 at radial distance RD1 from axis of rotation AR, through-bores 202 including through-bore 202A and through-bores 203 at radial distance RD2 from axis of rotation AR, through-bores 203 including through-bore 203A and through-bore 203B. Through-bore 202A is circumferentially disposed between respective circumferentially adjacent through-bores 203A and 203B. Each through-bore 203A is arranged at distance D3, in circumferential direction CD1, from each respective through-bore 202A. Through-bore 203B is arranged at distance D4, different from distance D3, in circumferential direction CD2, opposite circumferential direction CD1, from each respective through-bore 202A. Arc A passes through through-bores 202 and 203 and through-bores 202A, 203A and 203B circumferentially.

Since through-bores 202 are arranged radially offset from through-bores 203 and 204 and asymmetrically between circumferentially adjacent through-bores 203, friction lining 209 can be secured to side 205 only and not side 206 by fasteners 211 and 213 and friction lining 210 can be secured to side 206 only and not side 205 by fasteners 212 and 213. Although through-bores 202 and 203 are shown alternating in circumferential direction CD, it should be understood that other sequences are possible. For example, a respective through-bore 202 may not be located between each pair of circumferentially adjacent through-bores 203.

In an example embodiment, each through-bore of through-bores 202 and each fastener of fasteners 211 are arranged, in circumferential direction CD, between two respective circumferentially adjacent through-bores 203 and fasteners 212, respectively; and each through-bore 203 and fastener 212 are arranged, in circumferential direction CD, between two respective circumferentially adjacent through-bores 202 and fasteners 211.

Referring to FIG. 11, fastener 211A is circumferentially disposed between two circumferentially adjacent fasteners 212A and 212B. Fastener 211A is arranged distance D5, in circumferential direction CD1, from fastener 212A and fastener 211A is arranged distance D6, in circumferential direction CD2, opposite circumferential direction CD1, from fastener 212B. Distance D5 is smaller than distance D6. Thus, like through-bore 202A being arranged asymmetrically between through-bores 203A and 203B, fastener 211A is arranged asymmetrically between fasteners 212A and 212B.

In an example embodiment, fasteners 211 are radially outward of fasteners 212 and 213, respectively. In an example embodiment, fasteners 211 are radially inward of fasteners 212 and radially outward of fasteners 213. In other words, fasteners 211 and 212 can be reversed.

Due to fasteners 211, 212 and 213 being arranged asymmetrically and at different distances RD1, RD2 and RD3, respectively, (or along offset pitch circles), if friction lining 209 is applied to side 206 and/or friction lining 210 is applied to side 205, through-bores 202, 203 and 204 are not aligned with the through-bores of linings 209 and 210 to accommodate fasteners 211, 212 and 213. This arrangement prevents the improper assembly of clutch disc 200 with friction linings 209 and 210 on faces 206 and 205, respectively.

In an example embodiment, friction lining 209 is a full ring of friction material, for example, organic material, secured to drive plate 201. In an example embodiment, friction lining 209 is a full ring of an organic material with grooves that is fixed to individual segments via rivets and those segments are, in turn, fixed within clutch disc 200. In an example embodiment, friction lining 210 includes portions 214 and 215, respectively, disposed circumferentially about drive plate 201. In other words, friction lining 210 is circumferentially segmented. In an example embodiment, friction lining 210 includes individual cerametallic friction pads bonded to a plate and rivets fix the plate within clutch disc 200. In the example embodiment shown in FIGS. 6 and 8, friction lining 210 is circumferentially segmented and portion 215A is a segment of circumferentially segmented friction lining 210 and circumferentially disposed between fasteners 211B and 213B in circumferential direction CD1 and fasteners 212C and 213A in circumferential direction CD2 opposite circumferential direction CD1. In other words, portion 215A is circumferentially disposed between four fasteners. Fasteners 211B, 212C and 213A and 213B form the quadrilateral discussed above in the description regarding FIG. 5.

In an example embodiment, friction lining 209 is made of an organic material. In an example embodiment, friction lining 209 is made of yarn (roving, aramid, copper wire, and acrylic yarn) which is coated with a friction cement (rubber, resins, sulpher, glass fiber). In an example embodiment, friction lining 210 is made of a cerametallic material. Cerametallic materials are more aggressive and have a higher coefficient of friction than organic materials. The combination of the organic and cerametallic materials of friction linings 209 and 210 provides increased power levels without slippage.

In an example embodiment, clutch disc 200 includes axis of rotation AR, drive plate 201, friction lining 209, friction lining 210, and fasteners 211, 212 and 213. Drive plate 201 is concentrically arranged about axis of rotation AR and includes side 205 facing axial direction AD1 and side 206 facing axial direction AD2, opposite axial direction AD1. Fasteners 211, 212 and 213 secure friction linings 209 and 210 to sides 205 and 206, respectively, asymmetrically, such that: friction lining 209 can be secured to side 205 only and not to side 206 and friction lining 206 can be secured to side 206 only and not to side 205.

In an example embodiment, clutch disc 200 includes friction linings 209 and 210 and fasteners 211 and 212 securing friction lining 209 to side 205 and friction lining 210 to side 206, respectively. Fasteners 211 and 212 are disposed in through-bores 202 and 203, respectively. In an example embodiment, clutch disc 200 includes through-bores 204 and fasteners 213 arranged at radial distance RD3 from axis of rotation AR, different from radial distances RD1 and RD2. In this case, fasteners 211, 212 and 213 secure friction linings 209 and 210 to sides 205 and 206, respectively, via through-bores 202, 203 and 204, respectively.

Fasteners 211 are arranged at radial distance RD1 from axis of rotation AR. Fasteners 212 are arranged at radial distance RD2 from axis of rotation AR. Fasteners 213 are arranged at radial distance RD3 from axis of rotation AR. The minimum number of radial distances needed is two as shown in FIGS. 2 to 4. The number of radial distances needed for through-bores and fasteners increases depending on the size of the overall clutch disc desired.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A clutch disc, comprising:
a drive plate concentrically arranged about an axis of rotation, the drive plate having:
a first side facing a first axial direction; and,
a second side facing a second axial direction, opposite the first axial direction;
wherein the drive plate comprises a first plurality of through-bores at a first radial distance from the axis of rotation and a second plurality of through-bores at a second radial distance from the axis of rotation, where the second radial distance is different from the first radial distance, and wherein the first and second pluralities of through-bores are arranged such that an arc passes through the first and second pluralities of through-bores.

2. The clutch disc recited in claim 1, further comprising:
a first friction lining; and,
a first plurality of fasteners disposed in the first plurality of through-bores and arranged to secure the first friction lining to the first side of the drive plate.

3. The clutch disc recited in claim 2, further comprising:
a second friction lining; and,
a second plurality of fasteners disposed in the second plurality of through-bores and arranged to secure the second friction lining to the second side of the drive plate.

4. The clutch disc recited in claim 3, wherein the first or second friction lining is circumferentially segmented and a segment of the circumferentially segmented friction lining is circumferentially disposed between one fastener of the first plurality of fasteners and one fastener of the second plurality of fasteners.

5. The clutch disc recited in claim 1, wherein:
each first through-bore included in the first plurality of through-bores is circumferentially disposed between respective adjacent second and third through-bores included in the second plurality of through-bores;
the respective second through-bore is at a first distance, in the first circumferential direction, from the each respective first through-bore; and,
the respective third through-bore is at a second distance, different from the first distance, in a second circumferential direction, opposite the first circumferential direction, from the each respective first through-bore.

6. The clutch disc recited in claim 1, wherein each through-bore of the first plurality of through-bores is arranged, in the first circumferential direction, between two respective adjacent through-bores of the second plurality of through-bores.

7. A clutch disc, comprising:
a drive plate concentrically arranged about an axis of rotation, the drive plate having:
a first side facing a first axial direction; and,
a second side facing a second axial direction, opposite the first axial direction,
wherein the drive plate comprises a first plurality of through-bores at a first radial distance from the axis of rotation, a second plurality of through-bores at a second radial distance from the axis of rotation, where the second radial distance is different from the first radial distance, and a third plurality of through-bores at a third radial distance from the axis of rotation, different from the first and second radial distances, and wherein the first and second pluralities of through-bores are arranged such that an arc passes through the first and second pluralities of through-bores;
a first friction lining;
a first and second pluralities of fasteners disposed in the first and third pluralities of through bores, respectively, and arranged to secure the first friction lining to the first side;
a second friction lining; and,
a third plurality of fasteners disposed in the second and third pluralities of though-bores, respectively, and arranged to secure the second friction lining to the second side.

8. The clutch disc recited in claim 7, wherein the first and second pluralities of through-bores are radially outward of the third plurality of through-bores.

9. The clutch disc recited in claim 7, wherein:
each first through-bore included in the first plurality of through-bores is circumferentially disposed between respective adjacent second and third through-bores included in the second plurality of through-bores;

the respective second through-bore is at a first distance, in the first circumferential direction, from the each respective first through-bore; and, the respective third through-bore is at a second distance, different from the first distance, in a second circumferential direction, opposite the first circumferential direction, from the each respective first through-bore.

10. The clutch disc recited in claim 7, wherein each through-bore of the first plurality of through-bores is arranged, in the first circumferential direction, between two respective adjacent through-bores of the second plurality of through-bores.

11. The clutch disc recited in claim 7, wherein a first through-bore of the first plurality of through-bores, a second through-bore of the second plurality of through-bores, and third and fourth adjacent through-bores of the third plurality of through-bores are arranged such that they form a quadrilateral and the third and fourth adjacent through-bores are arranged circumferentially between the first and second through-bores.

12. The clutch disc recited in claim 11, wherein the quadrilateral is a trapezoid.

13. The clutch disc recited in claim 7, wherein the first or the second friction lining is circumferentially segmented and a segment of the circumferentially segmented friction lining is disposed around one fastener of the first plurality of fasteners and one fastener of the third plurality of fasteners.

14. A clutch disc, comprising:
a drive plate concentrically arranged about an axis of rotation, the drive plate having:
a first side facing a first axial direction;
a second side facing a second axial direction, opposite the first axial direction;
wherein the drive plate comprises a first plurality of through-bores at a first radial distance from the axis of rotation, the first plurality including a first through-bore and a second plurality of through-bores at a second radial distance from the axis of rotation, where the second radial distance is different from the first radial distance, the second plurality including circumferentially adjacent respective second and third through-bores, and wherein:
the first through-bore is circumferentially disposed between the respective circumferentially adjacent second and third through-bores;
the circumferentially adjacent respective second through-bore is at a first distance, in the first circumferential direction, from the first through-bore;
the circumferentially adjacent respective third through-bore is at a second distance, different from the first distance, in a second circumferential direction, opposite the first circumferential direction, from the first through-bore; and,
the first and second pluralities of through-bores are arranged such that an arc passes through the first and second pluralities of through-bores.

15. The clutch disc recited in claim 14, further comprising:
a first friction lining;
a second friction lining;
a first plurality of fasteners disposed in the first plurality of through-bores and arranged to secure the first friction lining to the first side; and,
a second plurality of fasteners disposed in the second plurality of through-bores and arranged to secure the second friction lining to the second side.

16. The clutch disc recited in claim 14, wherein the drive plate further comprises:
a third plurality of through-bores at a third radial distance, different from the first and second radial distances, from the axis of rotation.

17. The clutch disc recited in claim 16, further comprising:
a first friction lining;
a second friction lining;
a first plurality of fasteners disposed in the first plurality of through-bores and arranged to secure the first friction lining to the first side;
a second plurality of fasteners disposed in the second plurality of through-bores and arranged to secure the second friction lining to the second side; and,
a third plurality of fasteners disposed in the third plurality of through-bores and arranged to secure the first friction lining to the first side and the second friction lining to the second side.

18. The clutch disc recited in claim 17, wherein the first or second friction lining is circumferentially segmented and a segment of the circumferentially segmented lining is disposed around a fastener of the first or second pluralities of fasteners and a fastener of the third plurality of fasteners.

19. The clutch disc recited in claim 17, wherein:
the first or second friction lining is circumferentially segmented; and,
a segment of the circumferentially segmented friction lining is circumferentially disposed between:
in the first circumferential direction, a fastener from the first plurality of fasteners and a first fastener from the third plurality of fasteners; and,
in the second circumferential direction opposite the first circumferential direction, a fastener from the second plurality of fasteners and a second fastener from the third plurality of fasteners.

20. The clutch disc recited in claim 14, wherein the first radial distance is greater than the second radial distance.

* * * * *